United States Patent
Bian et al.

(10) Patent No.: US 11,579,360 B2
(45) Date of Patent: Feb. 14, 2023

(54) OPTICAL ANTENNA WITH REFLECTIVE MATERIAL FOR PHOTONIC INTEGRATED CIRCUIT AND METHODS TO FORM SAME

(71) Applicant: GLOBALFOUNDRIES U.S. Inc., Malta, NY (US)

(72) Inventors: Yusheng Bian, Ballston Lake, NY (US); Qizhi Liu, Lexington, MA (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/354,408

(22) Filed: Jun. 22, 2021

(65) Prior Publication Data
US 2022/0404547 A1 Dec. 22, 2022

(51) Int. Cl.
G02B 6/12 (2006.01)
G02B 6/34 (2006.01)
G02B 6/124 (2006.01)

(52) U.S. Cl.
CPC ......... *G02B 6/12004* (2013.01); *G02B 6/124* (2013.01); *G02B 6/34* (2013.01)

(58) Field of Classification Search
CPC ....... G02B 6/12004; G02B 6/124; G02B 6/34
See application file for complete search history.

(56) References Cited

U.S. PATENT DOCUMENTS

| | | |
|---|---|---|
| 7,304,781 B2 | 12/2007 | Chang-Hasnain et al. |
| 7,321,713 B2 | 1/2008 | Akiyama et al. |
| 7,936,448 B2 | 5/2011 | Albuquerque et al. |
| 8,422,841 B1 | 4/2013 | Shi et al. |
| 8,670,476 B2 | 3/2014 | Goddard et al. |
| 8,988,754 B2 | 3/2015 | Sun et al. |
| 9,057,844 B2 | 6/2015 | Doany et al. |
| 9,612,411 B2 | 4/2017 | Hatori et al. |
| 10,585,245 B1 | 3/2020 | Bian et al. |
| 2011/0049735 A1* | 3/2011 | Sakuma ................. G02B 6/124 264/1.24 |
| 2015/0117817 A1* | 4/2015 | Chen ..................... G02B 6/305 359/569 |
| 2015/0346340 A1 | 12/2015 | Yaacobi et al. |

(Continued)

FOREIGN PATENT DOCUMENTS

| | | |
|---|---|---|
| EP | 2703858 A1 | 3/2014 |
| WO | 2013037900 A1 | 3/2013 |

OTHER PUBLICATIONS

Bian et al., "Monolithically integrated silicon nitride platform," OFC 2021, 3 pages.

(Continued)

*Primary Examiner* — Ellen E Kim
(74) *Attorney, Agent, or Firm* — Anthony Canale; Hoffman Warnick LLC

(57) ABSTRACT

Embodiments of the disclosure provide an optical antenna for a photonic integrated circuit (PIC). The optical antenna includes a vertically oriented semiconductor waveguide with a first end on a semiconductor layer. The vertically oriented semiconductor waveguide includes a first sidewall and a second sidewall opposite the first sidewall. A reflective material is along the second sidewall of the vertically oriented semiconductor waveguide. A first plurality of grating protrusions extends from the first sidewall of the vertically oriented semiconductor waveguide.

20 Claims, 13 Drawing Sheets

(56) References Cited

U.S. PATENT DOCUMENTS

| | | | |
|---|---|---|---|
| 2018/0088275 A1 | 3/2018 | Okayama | |
| 2018/0267237 A1 | 9/2018 | Oonawa et al. | |
| 2019/0094467 A1 | 3/2019 | Hassan et al. | |
| 2019/0352767 A1* | 11/2019 | Yu | C23C 14/34 |
| 2020/0006606 A1* | 1/2020 | Shipton | H01L 33/0008 |
| 2020/0218012 A1* | 7/2020 | Wang | G01S 7/4811 |
| 2020/0341200 A1 | 10/2020 | Van Vaerenbergh et al. | |

OTHER PUBLICATIONS

Bian et al., "Towards low-loss monolithic silicon and nitride photonic building blocks in state-of-the-art 300mm CMOS foundry," Frontiers in Optics: Laser Science, 2020, 2 pages.

Giewont et al., "300-mm Monolithic Silicon Photonics Foundry Technology," IEEE Journal of selected topics in Quantum Electronics, vol. 25, No. 5, Sep./Oct. 2019, 12 pages.

Pita et al., "Design of a compact CMOS-compatible photonic antenna by topological optimization," Research Article: Optic Express, vol. 26, No. 3, Feb. 5, 2018, pp. 2435-2442.

Rakowski et al., "45nm CMOS—Silicon Photonics Monolithic Technology (45CLO) for next-generation, low power and high speed optical interconnects," OFC 2020, IEEE download Nov. 15, 2020, 3 pages.

Sun et al., "Large-scale nanophotonic phased array," Research Letter, vol. 493, Nature, Jan. 10, 2013, pp. 195-199.

Zhang et al., "Sub-wavelength Specing Optical Phase Array Nanoantenna Emitter with Vertical Silicon Photonic Vias," Optical Safety of America, 2018, downloaded from IEEE Jan. 6, 2021, 3 pages.

Bian et al., "Light manipulation in a monolithic silicon photonics platform leveraging 3D coupling and decoupling," Frontiers in Optics / Laser Science OSA 2020, 2 pages.

Non Final Office Action dated Oct. 7, 2022 for U.S. Appl. No. 17/197,133, filed Mar. 10, 2021; pp. 18.

* cited by examiner

OPTICAL ANTENNA WITH REFLECTIVE MATERIAL FOR PHOTONIC INTEGRATED CIRCUIT AND METHODS TO FORM SAME

TECHNICAL FIELD

The subject matter disclosed herein relates to the transmission of optical signals in a photonic integrated circuit (PIC). More specifically, the disclosure relates to an optical antenna and reflector for a PIC, and related methods to form the same.

BACKGROUND

The rise of networking devices, such as the "Internet of Things" (IoT), with links to a data center has accompanied a larger number of signal-processing elements in semiconductor wafers. Semiconductor chips may be modified, adapted, etc., to house the various components needed to transmit light from one component to another. Semiconductor chips which include photonic devices and microcircuitry are known as "photonic integrated circuits" (PICs). PIC dies typically include optical components on the surface or at the edge of a PIC die to transmit light into and from the optical devices therein, such as waveguides and grating couplers. The various optical components, e.g., photonic waveguides, photonic transmitters and receivers, etc., can relay signals through light transmission.

A technical challenge associated with PIC technology is possible signal loss through the use of vertically oriented optical grating couplers. Optical grating couplers, or other structures for directing optical signals, are typically deployed in silicon photonic chips to connect two displaced photonic waveguides. Conventional grating couplers or other structures may exhibit a limited range of emission angles, and thus have a restricted field of view. In some technical applications, such as light detection and ranging or "LiDAR," conventional grating couplers or other structure for light transmission have not provided sufficient field of view, and thus signal fidelity, for all operations.

SUMMARY

Aspects of the present disclosure provide an optical antenna for a photonic integrated circuit (PIC), the optical antenna including: a vertically oriented semiconductor waveguide with a first end on a semiconductor layer, the vertically oriented semiconductor waveguide including a first sidewall and a second sidewall opposite the first sidewall; a reflective material along the second sidewall of the vertically oriented semiconductor waveguide; and a first plurality of grating protrusions extending from the first sidewall of the vertically oriented semiconductor waveguide.

Further aspects of the present disclosure provide an optical antenna for a photonic integrated circuit (PIC), the optical antenna including: a first vertically oriented semiconductor waveguide with a first end on a semiconductor layer, the first vertically oriented semiconductor waveguide including a first sidewall and a second sidewall opposite the first sidewall; a reflective material along the second sidewall of the first vertically oriented semiconductor waveguide; and a first plurality of grating protrusions extending from the first sidewall of the first vertically oriented semiconductor waveguide; a dielectric layer horizontally adjacent the first vertically oriented semiconductor waveguide, wherein portions of the dielectric layer interdigitate with the first plurality of grating protrusions; and a nitride layer having a first portion on a second end of the first vertically oriented semiconductor waveguide.

Another aspect of the present disclosure provides a method of forming an optical antenna, the method including: forming a vertically oriented semiconductor waveguide over a semiconductor layer, the vertically oriented semiconductor waveguide including a first sidewall and a second sidewall opposite the first sidewall; forming a reflective material along the second sidewall of the vertically oriented semiconductor waveguide; and forming a first plurality of grating protrusions extending from the first sidewall of the vertically oriented semiconductor waveguide.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

The present disclosure provides an optical antenna for an integrated circuit (PIC). Optical antennae according to the disclosure may include a vertically oriented semiconductor waveguide, with a sidewall adjacent reflective material to reduce optical leakage and enhance coupling efficiency using horizontal reflectors. The vertically oriented semiconductor waveguide may have a first (lower) end on a semiconductor layer. A reflective material is along one sidewall of the vertically oriented semiconductor waveguide. A plurality of grating protrusions extends from another sidewall of the vertically oriented semiconductor waveguide. A capping layer (e.g., of nitride) may be on a second (upper) end of the semiconductor waveguide.

Figure 1:
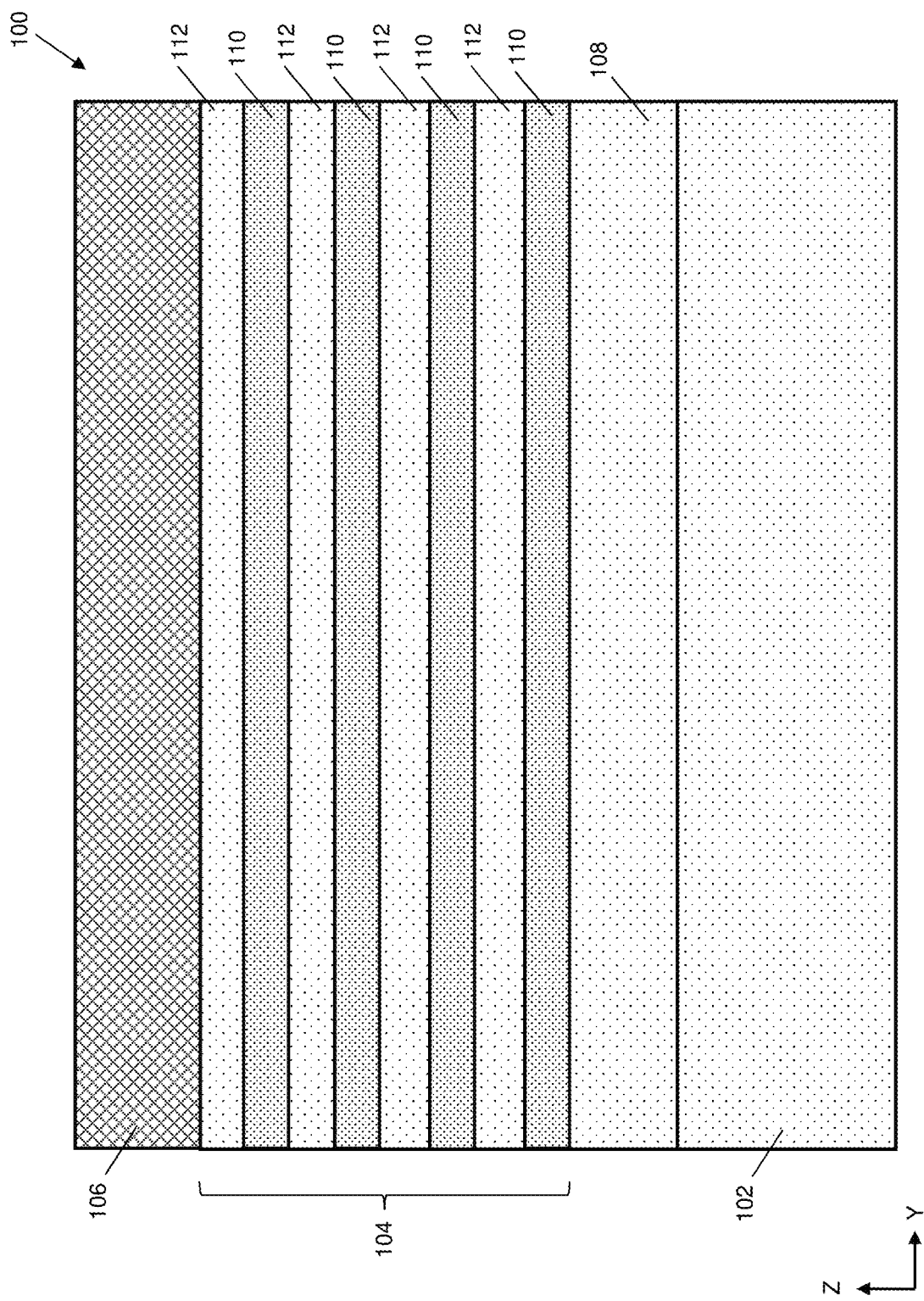
FIG. 1 shows a cross-sectional view of an initial structure to form an optical antenna according to embodiments of the disclosure.

Referring initially to FIG. 1, embodiments of the disclosure provide a method to form an optical antenna for a PIC die. An initial structure 100 to be processed according to the disclosure may include materials that are also used to form portions of a device layer, e.g., several transistors, in a complementary metal oxide semiconductor (CMOS) region elsewhere on the same device. Initial structure 100 may include a semiconductor layer 102 at least partially formed of any currently known or later developed semiconductor material, which may include without limitation; silicon, germanium, silicon germanium, and substances consisting essentially of one or more III-V compound semiconductors having a composition defined by the formula $Al_{X1}Ga_{X2}In_{X3}As_{Y1}P_{Y2}N_{Y3}Sb_{Y4}$, where X1, X2, X3, Y1, Y2, Y3, and Y4 represent relative proportions, each greater than or equal to zero and X1+X2+X3+Y1+Y2+Y3+Y4=1 (1 being the total relative mole quantity). Semiconductor layer 102 may be a portion of a semiconductor waveguide for transmitting optical signals to an optical antenna, as described elsewhere herein.

Initial structure 100 may include a stack of semiconductor layers ("semiconductor stack") 104 above semiconductor layer 102. Semiconductor stack 104 provides several layers of semiconductor material that may be processed into an optical antenna in methods according to the disclosure. Semiconductor stack 104 may be formed on an additional layer of semiconductor material ("antenna base") 108 positioned on semiconductor layer 102. Antenna base 108 may have the same composition as semiconductor layer 102, and may eventually protrude from the upper surface of semiconductor layer 102 after being processed in subsequent phases. In cases where initial structure 100 is formed on bulk silicon, antenna base 108 may be a portion of a bulk silicon layer. Antenna base 108 indicates portions of semiconductor material on which semiconductor stack 104 and grating structures for an optical antenna can be formed. In an example implementation, antenna base 108 may have a thickness of at least approximately six hundred Angstroms (Å), or in the case of a bulk semiconductor layer, may be a top-most portion of semiconductor layer 102 having approximately the same thickness.

As shown in FIG. 1, semiconductor stack 104 may include a set of first semiconductor layers 110, vertically alternating with a set of second semiconductor layers 112. First and second sets of semiconductor layers 110, 112 may initially be formed as alternating layers of semiconductor material on antenna base 108, and individual layers within each set of semiconductor layers 110, 112 optionally may have substantially the same vertical thickness. Each set of semiconductor layers 110, 112 may include one or more distinct layers, and each set of semiconductor layers 110, 112 according to the illustrated example may include a plurality of individual layers. Sets of semiconductor layers 110, 112 may be formed from any currently known or later developed semiconductor material, e.g., silicon in single crystal and/or polycrystalline form, silicon germanium (SiGe), etc. In further implementations, any of the various example semiconductor implementations discussed with respect to semiconductor layer 102 may be operable for use in either or both sets of semiconductor layers 110, 112. First set of semiconductor layers 110, however, may be composed of a different material relative to second set of semiconductor layers 112. The number of layers in each set 110, 112 may vary depending on intended applications. Four distinct layers are illustrated in each set 110, 112 solely as an example.

The composition of each layer in semiconductor stack 104 may allow a fabricator to modify first semiconductor layer 110 without affecting second semiconductor layer 112, or vice versa. According to an example, first set of semiconductor layers 110 may be highly doped with boron (B) or similar doping materials to allow selective etching and/or recessing relative to second set of semiconductor layers 112. In the case where sets of semiconductor layers 110, 112 have distinct dopant types and/or doping concentrations, first set of semiconductor layers 110 may have an approximately five percent (or other percentage) of boron doping, second set of semiconductor layers 112 may have substantially no boron doping, or vice versa. In further implementations, first semiconductor layer 110 may include crystalline silicon while second semiconductor layer 112 includes silicon germanium (SiGe), or vice versa. It is understood that sets of semiconductor layers 110, 112 may have other types of structural differences to enable selective processing (e.g., etching of one set of semiconductor layers without etching the other set of semiconductor layers). Each set of semiconductor layers 110, 112 may have a thickness of, e.g., approximately one hundred Å or less, to provide the intended thickness of grating protrusions in subsequent processing.

Initial structure 100 may include a nitride cap 106 over semiconductor stack 104. As an example, nitride cap 106 is illustrated as being on the upper surface of second set of semiconductor layers 112, but nitride cap 106 alternatively may be on a layer of first set of semiconductor layers 110 or another portion of semiconductor stack 104 in further examples. Nitride cap 106 may be an inert structure included to protect semiconductor stack 104 during subsequent processing. As discussed elsewhere herein, nitride cap 106 may form part of a nitride waveguide for transmitting optical signals to other portions of a device. Nitride cap 106 thus may include silicon nitride (SiN) and/or other types of light transmitting materials. In this configuration, semiconductor stack 104 is vertically between semiconductor layer 102 and nitride cap 106, and may be processed to form a vertically extending, optically transmissive region therebetween.

Figure 2:
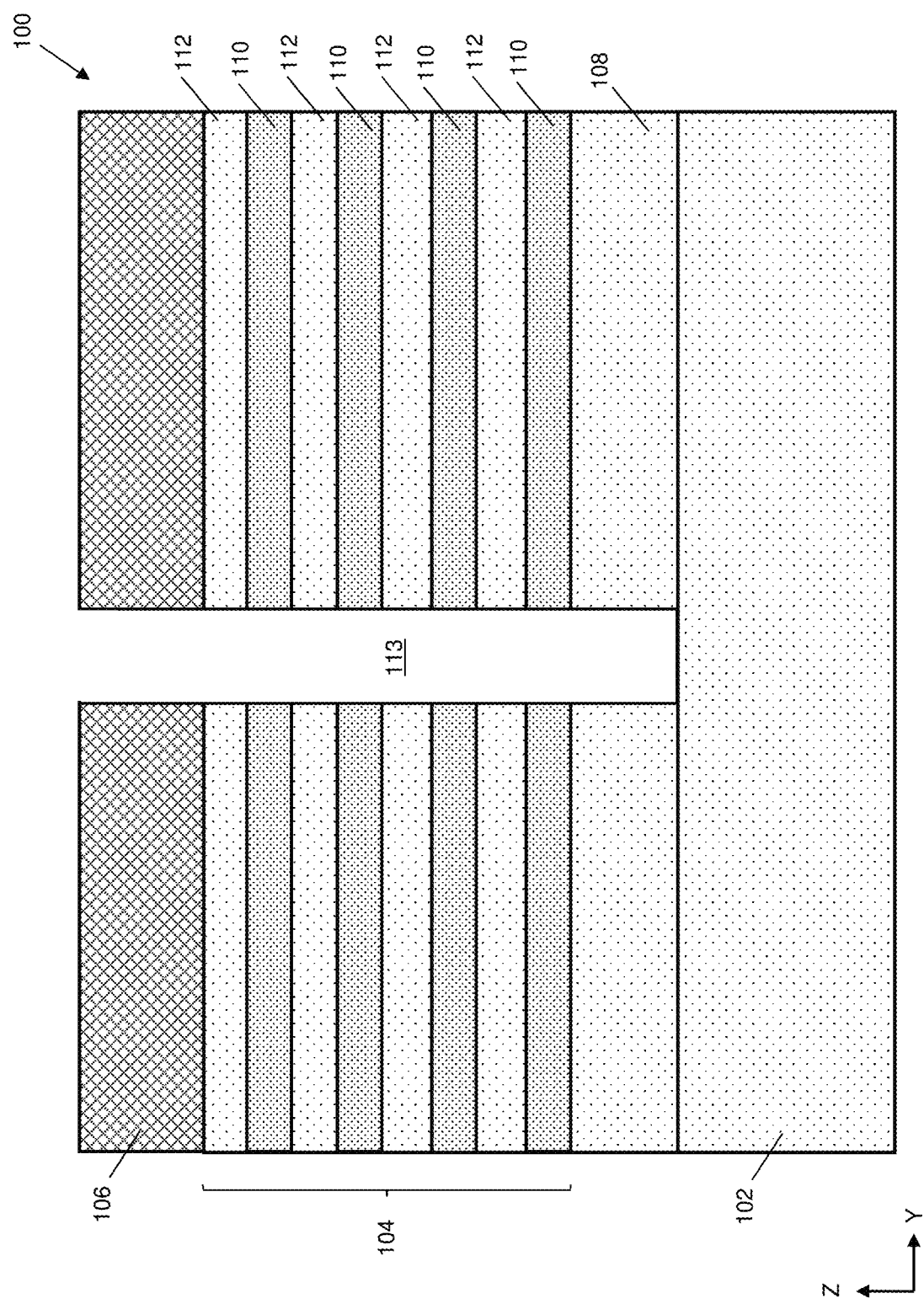
FIG. 2 shows a cross-sectional view of forming an opening for reflective material according to embodiments of the disclosure.

FIG. 2 depicts further processing of semiconductor stack 104, nitride cap 106, and antenna base 108 in methods according to the disclosure. To prepare for subsequent forming of reflective material, embodiments of the disclosure may include forming an opening 113 (e.g., by targeted vertical etch to semiconductor layer 102) in a vertical portion of semiconductor stack 104, nitride cap 106, and antenna base 108. Etching generally refers to the removal of material from an underlying layer, e.g., semiconductor stack 104 or others discussed herein, and is often performed with a mask (not shown) in place so that material may be selectively removed from certain areas, while leaving the material unaffected, in other areas. Etching may be performed using a plasma. Plasma systems can operate in several modes by adjusting the parameters of the plasma. Ordinary plasma etching produces energetic free radicals, neutrally charged, that react at the surface of the wafer. Since neutral particles attack the wafer from all angles, this process is isotropic. Ion milling, or sputter etching, bombards the wafer with energetic ions of noble gases which approach the wafer approximately from one direction, and therefore this process is highly anisotropic. Reactive-ion etching (RIE) operates under conditions intermediate between sputter and plasma etching and may be used to produce deep, narrow features such as opening 113. In the case of vertical etching, the size of a mask (not shown) used in the etching can define the width of opening 113. Opening 113 may expose an upper surface of semiconductor layer 102, and may extend through semiconductor stack 104 and nitride cap 106 to approximately the depth of antenna base 108.

Figure 3:
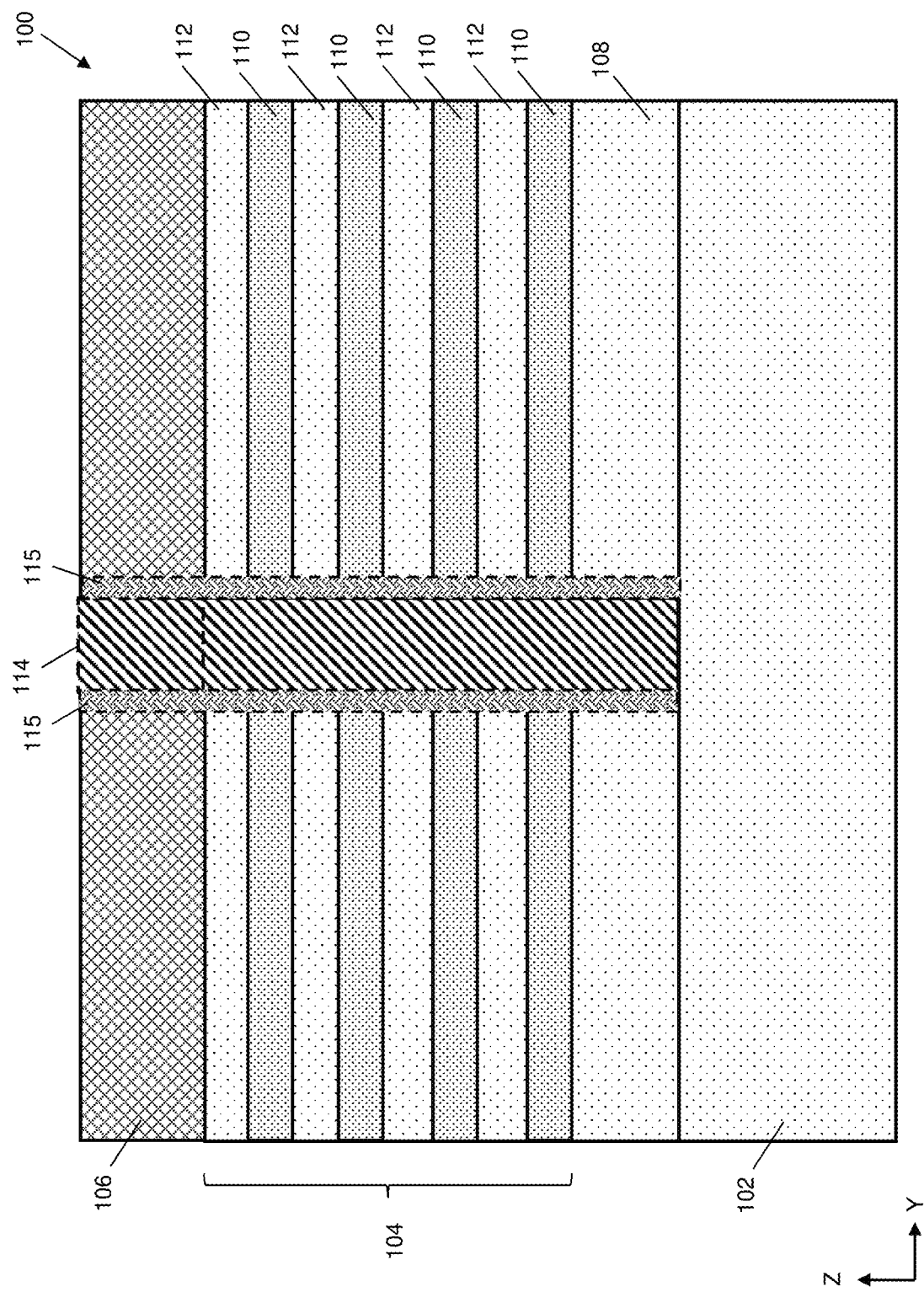
FIG. 3 shows a cross-sectional view of filling the opening with reflective material according to embodiments of the disclosure.

FIG. 3 depicts further processing to fill opening 113 (FIG. 2) with a reflective material 114. Reflective material(s) 114 may be any substance capable of reflecting light transmitted within portions of semiconductor stack 104. Reflective material 114 may be any substance having a refractive index of, e.g., at least approximately 1.50. Such materials may include metals, e.g., copper (Cu), aluminum (Al), cobalt (Co), nickel (Ni), tungsten (Ti), gold (Au), silver (Ag), platinum (Pt), zinc (Zn), etc. Reflective material 114 may also include metallic compounds or composite substances, e.g., titanium nitride (TiN), vanadium oxide ($VnO_2$), titanium dioxide ($TiO_2$), indium oxide ($In_2O_3$), silicide materials, metal alloys, etc. Further materials suitable for use as and/or within reflective material(s) 114 may include, e.g., metalloids such as germanium (Ge), and/or non-metals such as Si when used with waveguides and/or grating structures that are formed of materials other than Si (e.g., silicon nitride (SiN)).

Regardless of composition, reflective material(s) 114 may be formed by deposition. Deposition or "depositing" may include any now known or later developed techniques appropriate for the material to be deposited including but are not limited to, for example: chemical vapor deposition (CVD), low-pressure CVD (LPCVD), plasma-enhanced CVD (PECVD), semi-atmosphere CVD (SACVD) and high density plasma CVD (HDPCVD), rapid thermal CVD (RTCVD), ultra-high vacuum CVD (UHVCVD), limited reaction processing CVD (LRPCVD), metalorganic CVD (MOCVD), sputtering deposition, ion beam deposition, electron beam deposition, laser assisted deposition, thermal oxidation, thermal nitridation, spin-on methods, physical vapor deposition (PVD), atomic layer deposition (ALD), chemical oxidation, molecular beam epitaxy (MBE), plating, evaporation. After being formed, reflective material(s) 114 may be planarized (e.g., by way of chemical mechanical planarization (CMP)) such that the upper surface of reflective material(s) 114 is substantially coplanar with an upper surface of nitride cap 106 (where included), or otherwise substantially coplanar with an upper surface of semiconductor stack 104. Reflective material(s) 114 on semiconductor layer 102 thus may have at least the same vertical span as semiconductor stack 104, and may extend from an upper surface of semiconductor layer 102 to an upper surface of semiconductor stack 104 and/or nitride cap 106.

FIGS. 2 and 3 also depict the forming additional elements to protect portions of semiconductor stack(s) 104 from being affected while reflective material 114 is being formed. For example, embodiments of the disclosure may include forming one or more liners 115 in the form of insulative and/or other protective coatings on the sidewalls of opening 113. Liners 115 will be horizontally between reflective material 114 and semiconductor stack 104. Liner(s) 115 may include, e.g., silicon dioxide ($SiO_2$) and/or other insulative materials to protect portions of reflective material 114 from structurally and/or chemically affecting the composition of semiconductor stack 104 as reflective material 114 is formed (e.g. within opening 113 (FIG. 2)). Liner(s) 115 may be formed by conformal deposition within opening 113, and subsequent removal (e.g., by downward directional etch) to remove any remaining liner material on upper surfaces of semiconductor layer 102 and/or nitride cap 106. Liner(s) 115 may be a substantially transparent material, and thus may not interfere with the optical transmitting functions of subsequently formed optical antennae and/or the optically reflective functions of reflective material 114, despite being located horizontally between these two elements. Liner(s) 115 are depicted with dashed lines to indicate that they do not necessarily need to be formed within opening 113 before reflective material 114 is formed.

Figure 4:
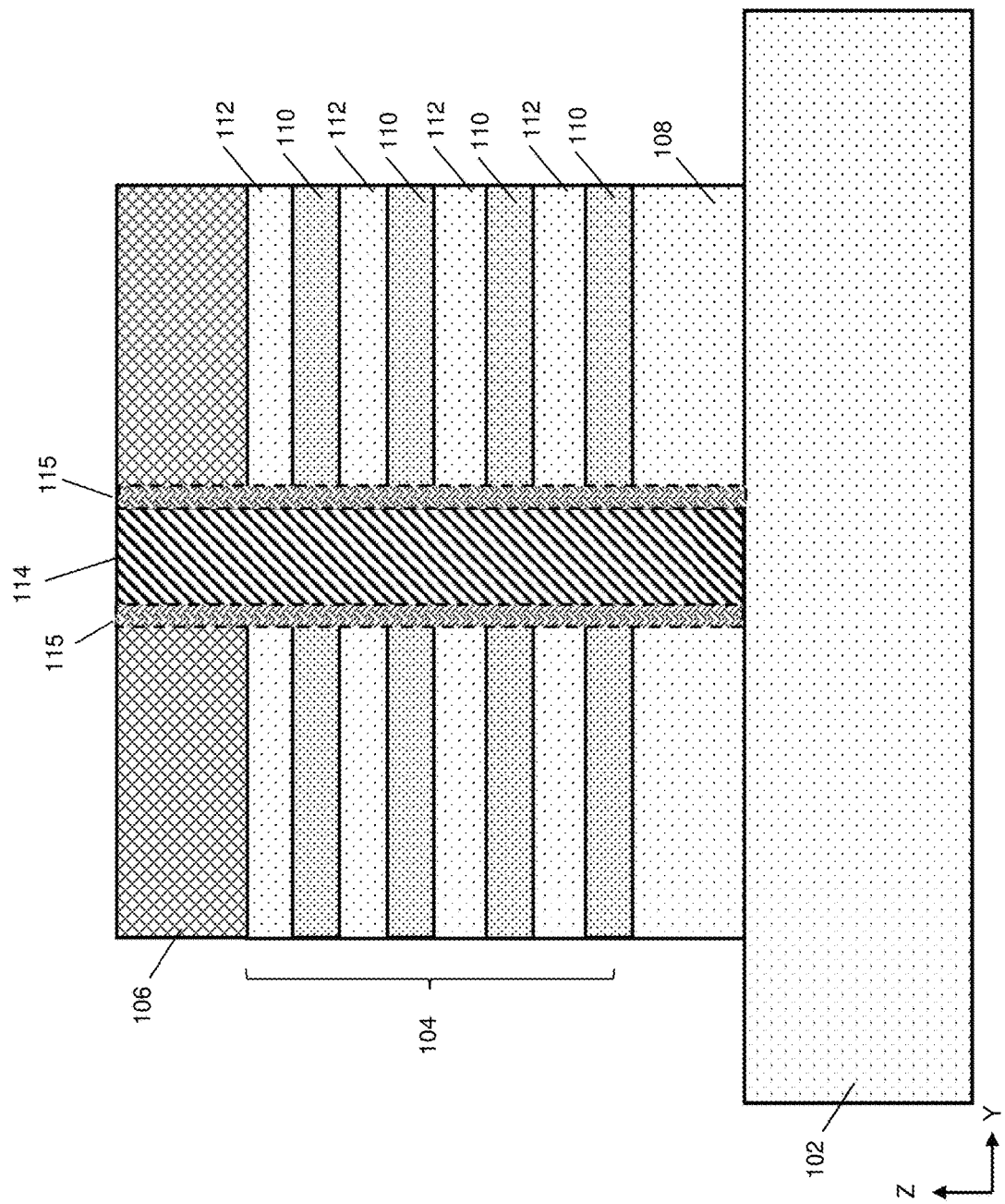
FIG. 4 shows a cross-sectional view of removing additional portions of the initial structure according to embodiments of the disclosure.

FIG. 4 depicts removing portions of semiconductor stack 104 and antenna base 108 uncover portions of semiconductor layer 102, thereby causing semiconductor stack 104 to become a freestanding structure over semiconductor layer 102 and antenna base 108. Selected portions of semiconductor stack 104 may be removed to uncover semiconductor layer 102, e.g., by vertical etching to the upper surface of semiconductor layer 102, as discussed herein with respect to forming opening(s) 113 (FIG. 2) for reflective material 114. Such etching may be implemented with a mask in place over reflective material 114 and adjacent portions of nitride layer 106, to protect these elements and portions of semiconductor stack 104 thereunder from being removed during the vertical etching. The remaining sets of semiconductor layers 110, 112 of semiconductor stack 104 include exposed sidewalls, and thus may be processed to form diffraction gratings.

Figure 5:
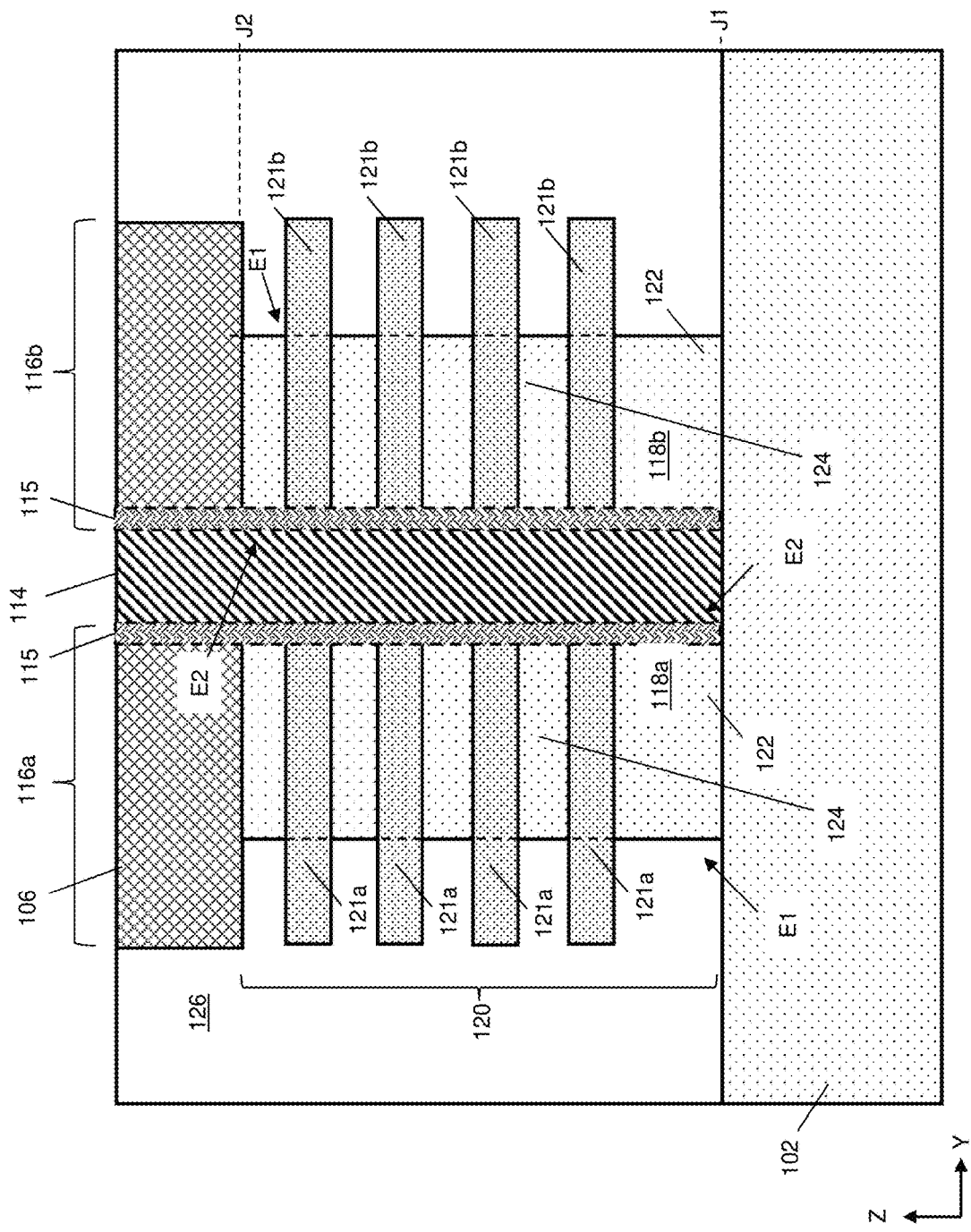
FIG. 5 shows a cross-sectional view of forming two waveguides adjacent the semiconductor material according to embodiments of the disclosure.

Turning to FIG. 5, subsequent processing may convert semiconductor stack 104 (FIGS. 1, 2) into a set (i.e., one or more) of optical antennae 116. Each semiconductor stack 104 may be further processed to yield a set (i.e., one or more) of semiconductor waveguides 118 (separately identified as semiconductor waveguides 118a, 118b), and a set of diffraction gratings 120 formed of several grating protrusions 121. Grating protrusions on each optical antenna 116a, 116b are separately labeled as 121a, 121b for sake of reference where applicable. Diffraction gratings 120 and protrusions 121a, 121b thereof may be formed using of one or more etchants selective to the composition of second set of semiconductor layers 110 (FIGS. 1, 2), such that only one set of semiconductor layers (i.e., first set 110 or second set 112) will be recessed without the other set being recessed. Remaining portions of stacked semiconductor material thus define semiconductor waveguide(s) 118a, 118b over semiconductor layer 102. The term "semiconductor waveguide"

refers to an optical media formed of semiconductor material extending vertically upward from semiconductor layer 102, horizontally between reflective material 114 and diffraction grating 120. In alternative implementations, diffraction gratings 120 and protrusions 121a, 121b thereof may be formed by repeated instances of deposition and etching. In some cases, portions of nitride cap 106 may be removed via the etching processes, while nitride cap 106 may be substantially unaffected in other implementations.

Optical antenna 116 in embodiments of the disclosure is defined as an assembly of light-transmitting, reflective, and diffracting elements capable of receiving incoming optical signals, and directing such optical signals to components or devices external to optical antenna 116. In the illustrated examples, two optical antennae 116 are separately labeled as 116a, 116b for sake of reference. Each optical antenna 116a, 116b may include semiconductor waveguide 118 and diffraction gratings 120 formed by processing of semiconductor stack 104 as discussed herein. Optical antenna(e) 116a, 116b additionally include reflective material 114 (and liner 115, where applicable) adjacent semiconductor waveguide 118. Optical antenna(e) 116a, 116b further may include nitride layer 106 above semiconductor waveguide 118 and diffraction grating(s) 120.

During operation, diffraction gratings 120 of Optical antenna(e) 116a, 116b may include several discrete elements (i.e., several spaced protrusions 121) that split and diffract an optical signal, e.g., radiation, into several separate beams depending on wavelength. The "pitch" of each protrusion 121 may denote the width of one grating protrusion plus the spacing between one grating protrusion and its adjacent grating protrusion. The pitch of protrusions in a diffraction grating determines the wavelength of the optical signal that can pass therethrough. Diffraction gratings 120 may have uniformly spaced protrusions 121a, 121b, but this is not necessarily required. Upon being formed, grating protrusions 121a may protrude from a first sidewall E1 of semiconductor waveguide 118a, while reflective material 114 may be located alongside a second, opposite sidewall E2 of semiconductor waveguide 118a. Grating protrusions 121b of optical antenna 116b similarly may be formed on a first sidewall E1 of another semiconductor waveguide 118b while reflective material 114 may be located alongside the second, opposite sidewall E2 of the other semiconductor waveguide 118a. In such a configuration, reflective material 114 may be horizontally between two semiconductor waveguides 118a, 118b (e.g., by being alongside respective sidewalls E2 of both waveguides 118a, 118b), though alternative arrangements and/or configurations are possible.

Semiconductor waveguide(s) 118a, 118b each may extend vertically (e.g., upward along the Z-axis) from semiconductor layer 102 to a predetermined vertical thickness (e.g., approximately 600 Å). Thus, semiconductor waveguide(s) 118a, 118b may include a first end J1 on an upper surface of semiconductor layer 102, and a second end J2 that is underneath a lower surface of nitride cap 106. A first portion 122 of semiconductor waveguide(s) 118a, 118b may include semiconductor material that is underneath diffraction protrusions 121a, 121b. A second portion 124 of semiconductor waveguide(s) 118a, 118b may include portions of semiconductor material with protrusions 121a, 121b of diffraction gratings 120 extending horizontally outward from first sidewall E1. Protrusions 121a, 121b of diffraction gratings 120 will divert light within semiconductor waveguide(s) 118a, 118b to other structures at various angles, and are discussed in further detail herein. Although two semiconductor waveguides 118a, 118b and two diffraction gratings 120 are shown in the Y-Z plane as an example, it is possible to include only one semiconductor waveguide 118a and/or diffraction grating 120 on semiconductor layer 102. Furthermore, additional diffraction gratings (not shown) may be formed on other sidewalls of semiconductor waveguide(s) 118a, 118b (e.g., in plane X-Z) in further implementations.

After optical antenna(e) 116a, 116b is/are formed, methods according to the disclosure may include forming a dielectric layer 126 (e.g., one or more oxide insulators) horizontally adjacent optical antenna(e) 116a, 116b, and vertically between adjacent protrusions 121a, 121b. Dielectric layer 126 may be composed of one or more oxide compounds, and/or any other currently known or later-developed electrically insulative substances. As examples, dielectric layer 126 may include materials such as: silicon nitride ($Si_3N_4$), silicon oxide ($SiO_2$), fluorinated $SiO_2$ (FSG), boro-phospho-silicate glass (BPSG), silsesquioxanes, carbon (C) doped oxides (i.e., organosilicates) that include atoms of silicon (Si), carbon (C), oxygen (O), and/or hydrogen (H), other low dielectric constant (<3.9) material, and/or layers thereof. In addition to providing electrical insulator, dielectric layer 126 may be substantially transparent to allow light to pass therethrough.

Figure 6:
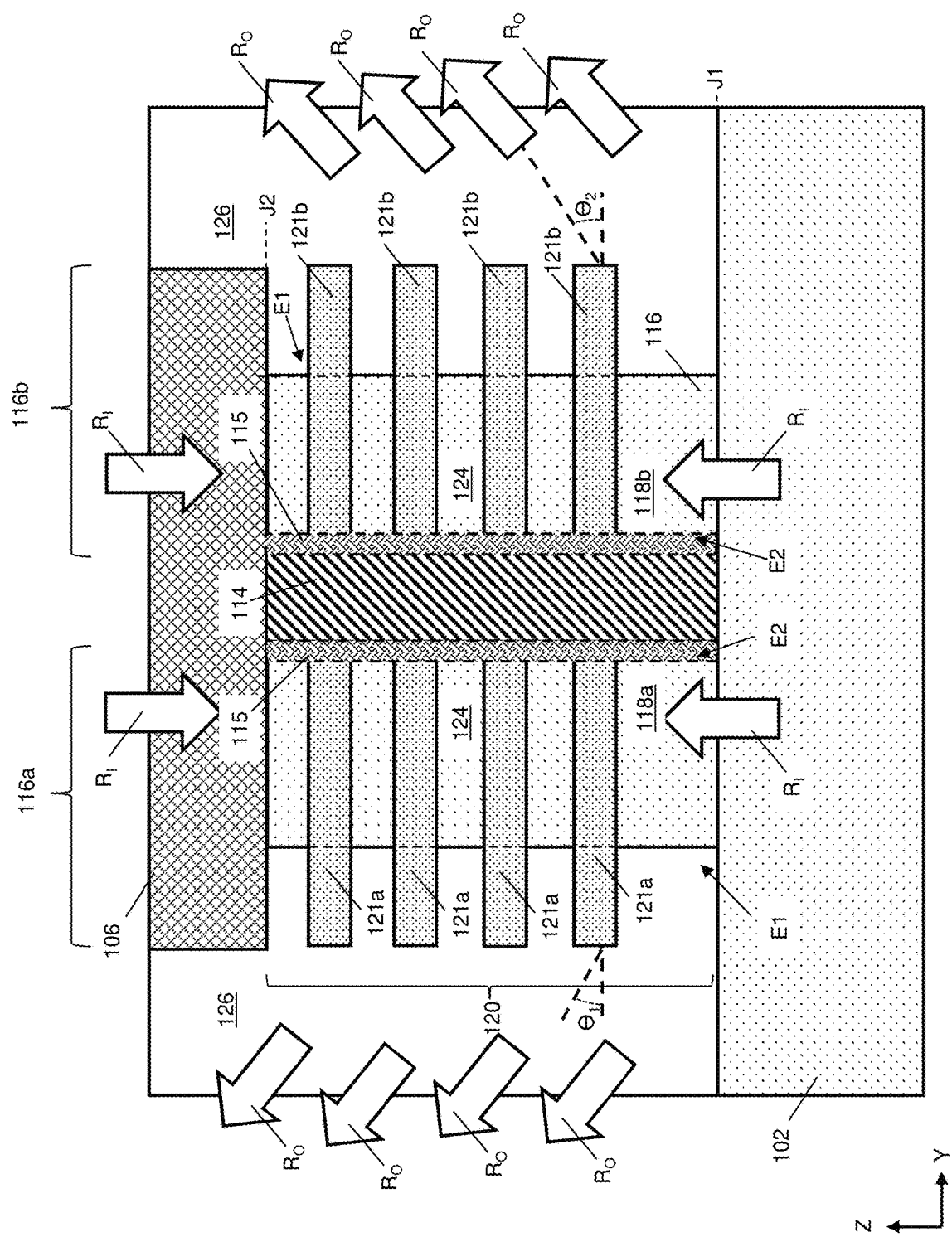
FIG. 6 shows a cross-sectional view an optical antenna annotated to show optical pathways through grating protrusions according to embodiments of the disclosure.

FIG. 6 depicts a further implementation, in which nitride cap 106 is over reflective material 114 (and any liners 115 thereon) in addition to being over semiconductor waveguides 118a, 118b. In this case, portions of nitride cap 106 may be in contact with reflective material 114, any liners 115, and second end J2 of semiconductor waveguide(s) 118a, 118b. Thus, second end J2 of semiconductor waveguide(s) 118a, 118b may be substantially coplanar with the upper surfaces of reflective material 114 and liners 115. Nitride cap 106 may be free of any reflective material 114 therein. The configuration shown in FIG. 6 may be particularly suited to implementations where nitride cap 106 includes and/or is coupled to an optical waveguide for providing input signals to optical antenna(e) 116.

FIG. 6 also provides an annotated view of optical antenna(e) 116a, 116b to illustrate the effects of reflective material 114 and diffraction gratings 120 during operation of a device. As noted elsewhere herein, semiconductor waveguide(s) 118a, 118b may include first vertical sidewall E1 from which protrusions 121a, 121b may extend, and second vertical sidewall E2 alongside reflective material 114. When optical antenna(e) 116a, 116b operates to send optical signals, input signals $R_I$ may enter semiconductor waveguide(s) 118a, 118b from semiconductor layer 102 and/or nitride cap 106. The horizontal-to-vertical junction between semiconductor waveguide(s) 118a, 118b and adjacent optical media (i.e., semiconductor layer 102 and/or nitride cap 106) causes input signals $R_I$ enter semiconductor waveguide (a) 118a, 118b along a partially vertical pathway, and partially toward diffraction grating(s) 120 or reflective material 114.

Any input signals $R_I$ in semiconductor waveguide(s) 118a, 118b that are partially oriented toward reflective material 114 will be reflected toward protrusions 121a, 121b of diffraction grating(s) 120. Diffraction grating(s) 120 then divert any incoming and/or reflected input signals $R_I$ (e.g., leftward and rightward in plane Y-Z) as output signals $R_O$. Output signal(s) $R_O$ may be oriented within a range of angles θ relative to a reference axis (e.g., Y-axis in FIG. 6). The range of angles θ may depend on factors such as the size, position, and/or other properties of each diffraction grating 120, as well as the material composition and/or position of reflective material 114. Different angles $θ_1$, $θ_2$ may be produced depending on protrusion 121a, 121b shape, and/or the position and composition of reflective material 114. Each diffraction grating 120 may have a respective "coupling efficiency" with respect to output signals $R_O$ directed therefrom. In the context of diffraction gratings, coupling efficiency refers to the quotient of optical power diffracted in a designated direction (e.g., along angle(s) $\theta_1$, $\theta_2$) relative to the power incident onto the diffractive element (i.e., protrusions 121a, 121b). Coupling efficiency is a dimensionless quantity, and typically is expressed as decibels (dB). By changing the number of protrusions 121a, 121b on optical antenna(e) 116a, 116b, their location(s) relative to reflective material 114, and/various other attributes, it is possible to adjust the coupling efficiency of diffraction gratings 120 to suit various applications.

Upon exiting optical antenna(e) 116a, 116b output signals $R_O$ may travel in various directions to other components, e.g., an optically interconnected receiver or transmitter for producing light-matter interaction. Such transmitters or receivers may be part of the same device where optical antenna(e) 116a, 116b are formed, or may form part of another device. Output signals $R_O$ then may be partially absorbed and reflected back to other IC chips and/or products that are external to the device where optical antenna(e) 116a, 116b is/are formed, or in the same IC chip as where optical antenna(e) 116a, 116b is/are formed. The received reflected signal may be converted to an electrical signal by the IC chip. Such structures may be in other IC chips and/or products that are external to the device where optical antenna(e) 116a, 116b is/are formed, or in the same IC chip as where optical antenna(e) 116a, 116b is/are formed. As noted herein, diffraction gratings 120 may include any material included within first or second set of semiconductor layer(s) 110, 112 (FIGS. 1, 2). Such materials may include but are not limited to: germanium (Ge), silicon (Si), or silicon germanium (SiGe).

Figure 7:
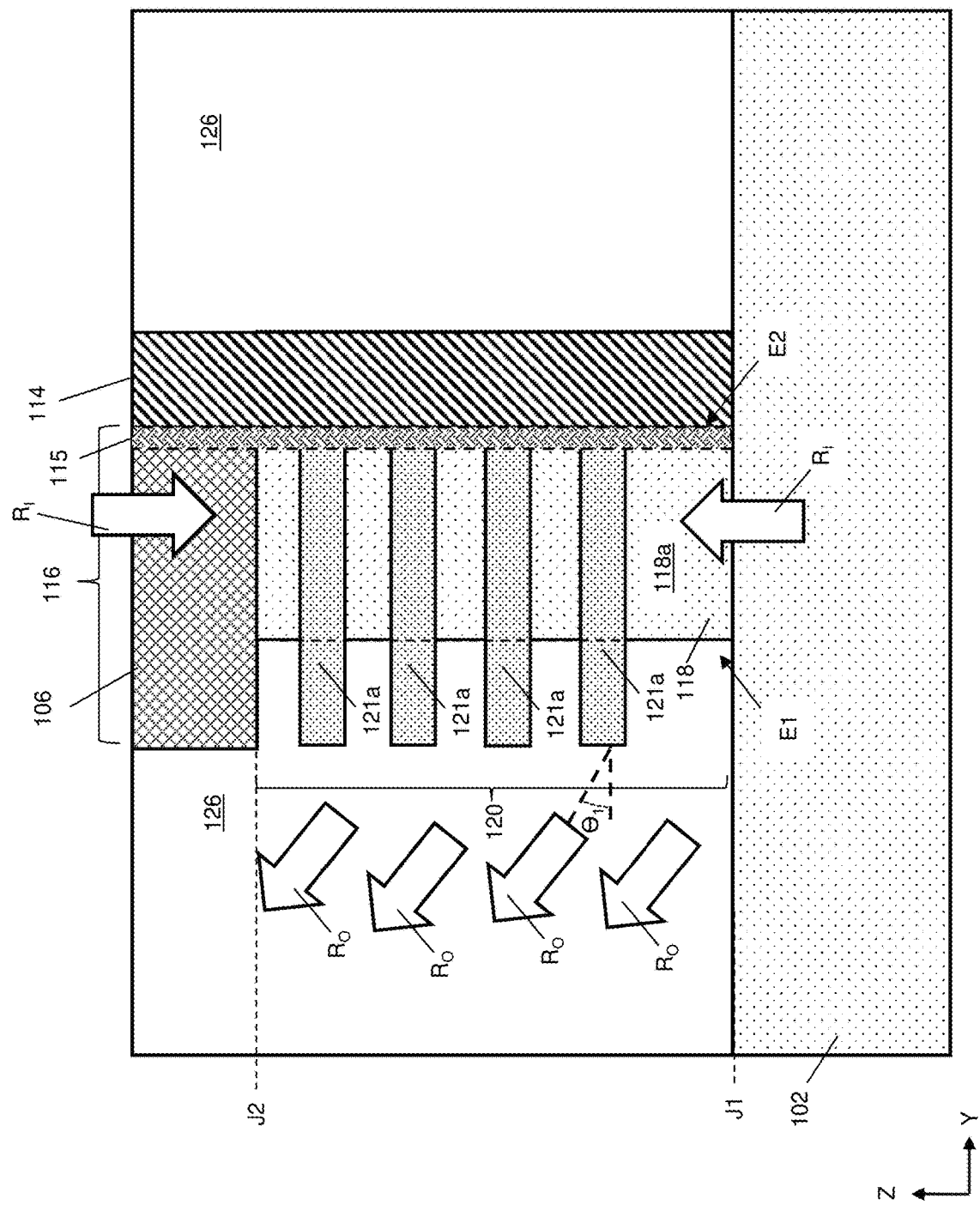
FIG. 7 shows a cross-sectional view of an optical antenna with a single vertical waveguide according to further embodiments of the disclosure.

Embodiments of the disclosure may include diffraction gratings 120 with protrusions 121a, 121b having substantially identical positions and pitch on respective first sidewalls E1 of semiconductor waveguides 118a, 118b. However, various embodiments of the disclosure may include diffraction gratings 120 with alternative positions, pitches, numbers of protrusions 121a, 121b, etc., to produce variations in how optical antenna(e) 116a, 116b will direct optical signals during operation. FIG. 7 depicts a further example in which only one semiconductor waveguide 118a is on semiconductor layer 102. In the case of a single optical antenna 116 and semiconductor waveguide 118a, protrusions 121a, 121b extend from first sidewall E1, and reflective material 114 may be located alongside second sidewall E2. In such a configuration, nitride layer 106 may extend horizontally from above diffraction gratings 120 to a sidewall of reflective material 114, or otherwise may be located above reflective material 114 without extending beyond the opposite end of reflective material 114. Thus, input optical signals $R_I$ entering semiconductor waveguide 118a may be reflected from reflective material 114 toward diffraction gratings 120, or may travel directly to diffraction gratings 120. In this case, only one set of output signals $R_O$ may be produced via one diffraction grating 120, in contrast to implementations where multiple output signals may be produced.

Figure 8:
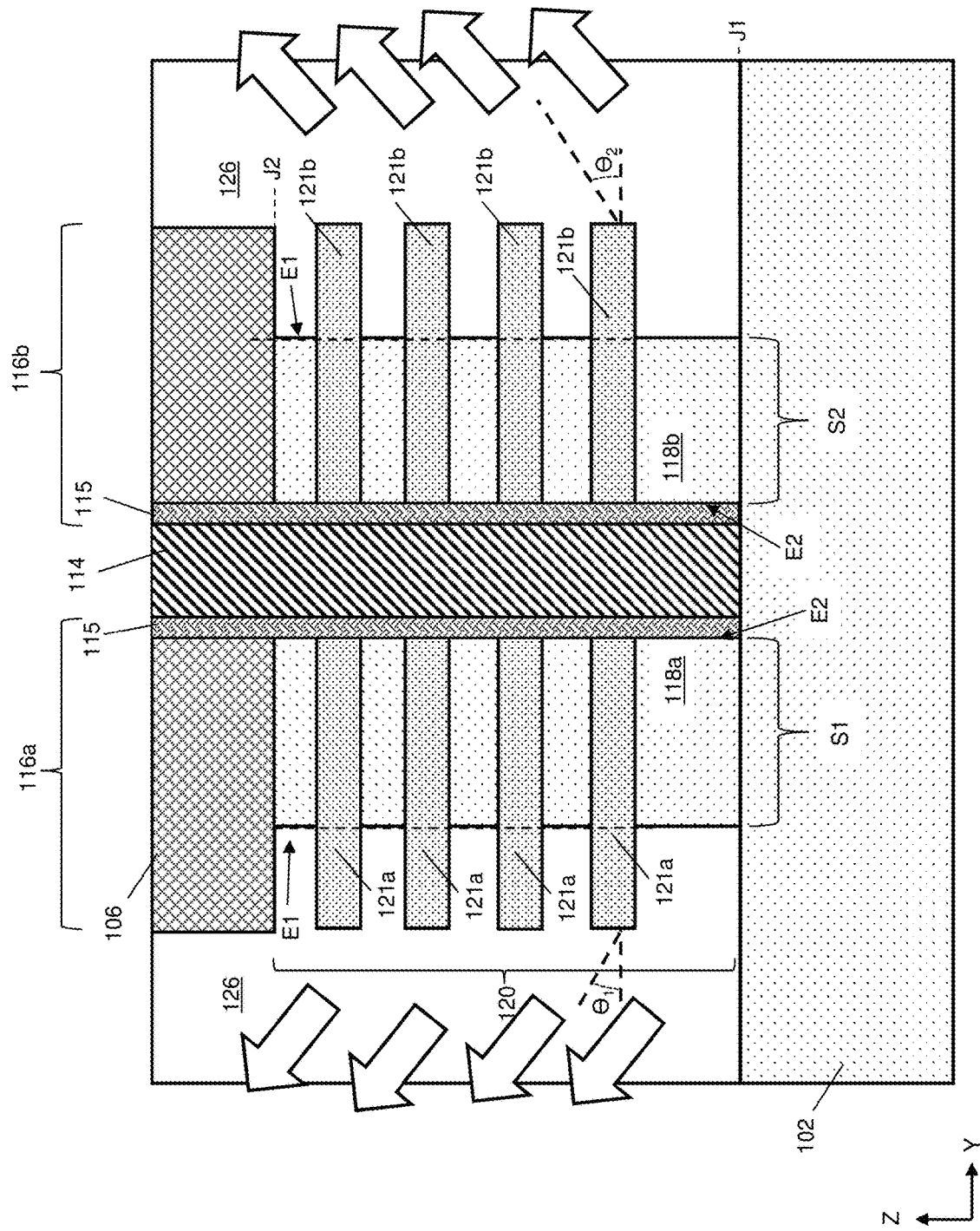
FIG. 8 shows a cross-sectional view of an optical antenna with a liner between a reflective material and a waveguide according to embodiments of the disclosure.
Figure 9:
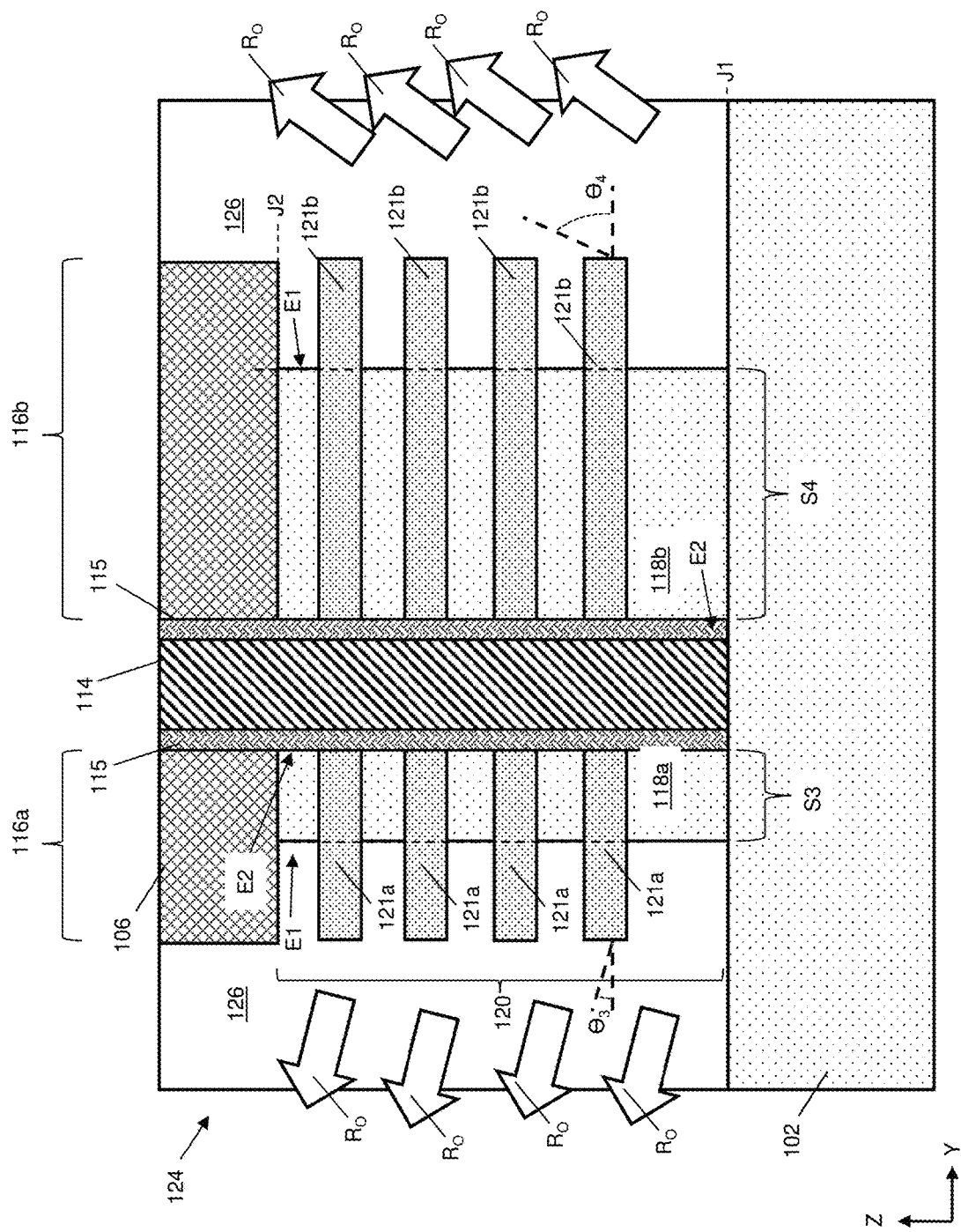
FIG. 9 shows a cross-sectional view of an optical antenna with two waveguides of varying width according to further embodiments of the disclosure.

Referring now to FIGS. 8 and 9, methods and structures according to the disclosure may vary the position, shape, and/or other aspects of reflective material 114 to affect the coupling efficiency of optical antenna(e) 116. FIG. 8 depicts an example in which reflective material 114 is between two semiconductor waveguides 118a, 118b of approximately equal horizontal width, while FIG. 9 depicts an example in which reflective material 114 is between two semiconductor waveguides with different horizontal widths. As shown in FIG. 8, in implementations where reflective material 114 is substantially midway between the outer sidewalls (i.e., each first sidewall E1 of optical antennae 116a, 116b), one semiconductor waveguide 118a may span a first horizontal separation distance S1 within optical antenna 116a between its first sidewall E1 and second sidewall E2 adjacent reflective material 114. Another semiconductor waveguide 118b may span a second horizontal separation distance S2 within optical antenna 116b between its first sidewall E1 and second sidewall E2 adjacent reflective material 114. In such an implementation, horizontal separation distances S1, S2 may be approximately the same. Semiconductor waveguides 118a, 118b having approximately equal separation distances may cause angles $\theta_1$, $\theta_2$ to be approximately equal. Thus, the grating efficiencies in each diffraction grating 120 of each optical antenna 116a, 116b may be substantially equal.

In further implementations (e.g., as shown in FIG. 9) reflective material 114 may be closer to one set of protrusions 121a than to another set of protrusions 121b. In this case, a horizontal separation distance S3 between reflective material 114 and protrusions 121a may be less than another horizontal separation distance S4 between reflective material 114 and protrusions 121b. The difference in horizontal separation distances S3, S4 may cause output signals $R_O$ from protrusions 121a to have an angle $\theta_3$ that is different from an angle $\theta_4$ of output signals $R_O$ from the other protrusions 121b. The difference between angles $\theta_3$, $\theta_4$, furthermore, may cause each diffraction grating 120 to have different grating efficiencies for output signals $R_O$ transmitted in different directions. Thus, a manufacturer of optical antenna(e) 116a, 116b can control the location of reflective material 114 to individually affect the grating efficiency through each diffraction grating 120. In cases where light predominately enters one semiconductor waveguide 118 and/or passes from semiconductor layer 102 or nitride layer 106 in one direction, adjusting the coupling efficiency of grating protrusion(s) 120 may improve signal transmission in certain applications.

Figure 10:
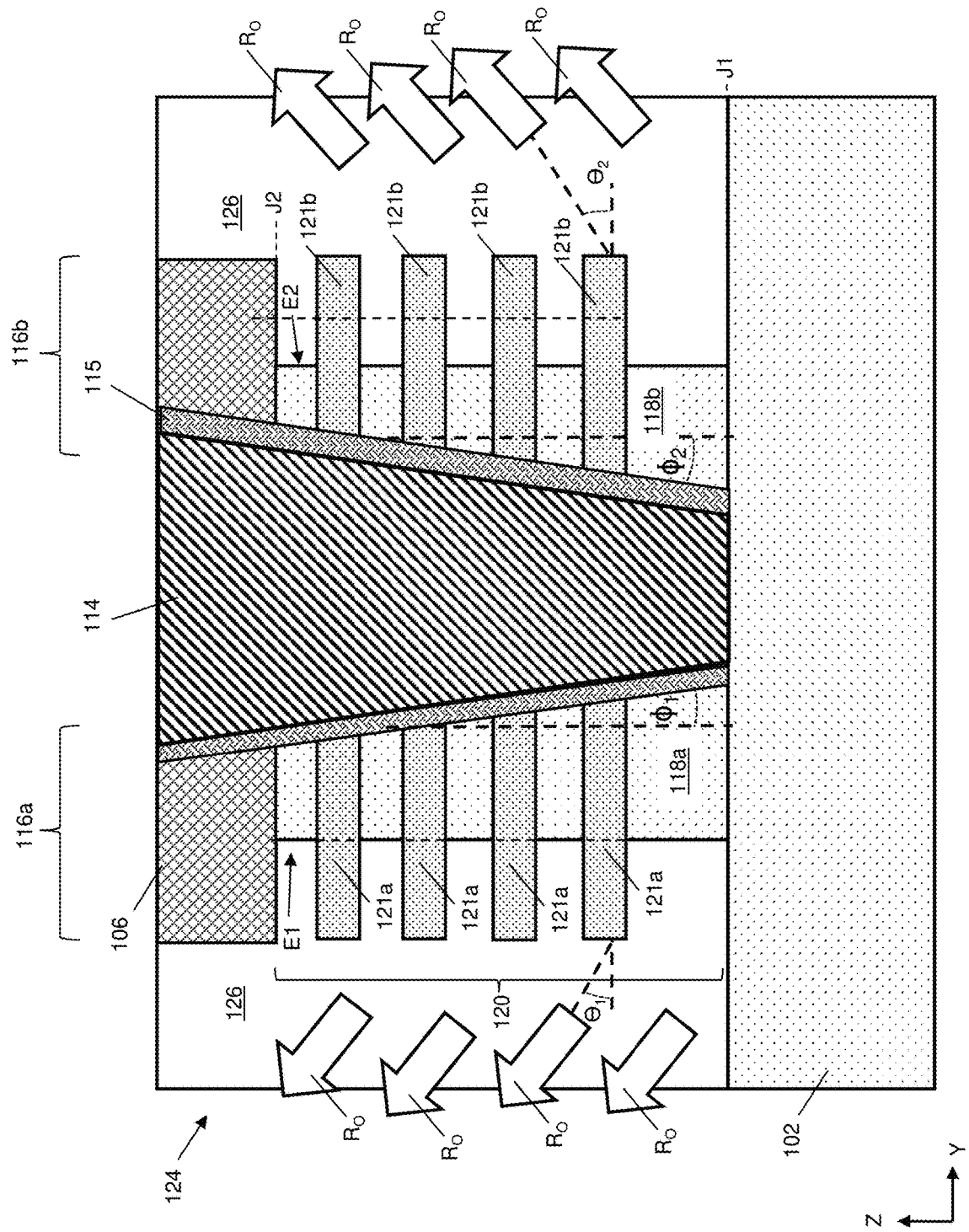
FIG. 10 shows a cross-sectional view of an optical antenna having reflective material with sidewalls that are non-perpendicular to a semiconductor layer according to embodiments of the disclosure.

FIG. 10 depicts a further implementation, in which reflective material 114 includes a non-rectangular (e.g., trapezoidal) shape with sidewalls that extend non-perpendicularly upward from semiconductor layer 102. In such implementations, one sidewall of reflective material 114 may have a first non-perpendicular angle $\Phi_1$ adjacent one semiconductor waveguide 116a. The other sidewall of reflective material 114 similarly may have a second non-perpendicular angle $\Phi_2$ that may be similar or equal to first non-perpendicular angle $\Phi_1$, but opposite in orientation. Reflective material 114 may be formed in a non-perpendicular configuration, e.g., by non-vertically etching semiconductor stack 104 (FIG. 1) such that opening 113 (FIG. 2) has a non-rectangular (e.g., trapezoidal) shape before being filled with reflective material 114. In cases where reflective material 114 is not in formed in the shape of a trapezoid, non-perpendicular angles $\Phi_1$, $\Phi_2$ may be different from each other. Non-perpendicular angles $\Phi_1$, $\Phi_2$ of reflective material 114 sidewalls may in turn affect the angles $\theta_1$, $\theta_2$ at which output signals $R_O$ exit diffraction gratings 120. Furthermore, non-perpendicular angles $\Phi_1$, $\Phi_2$ may cause each set of diffraction gratings 120 to have different grating efficiencies during operation as discussed herein.

Figure 11:
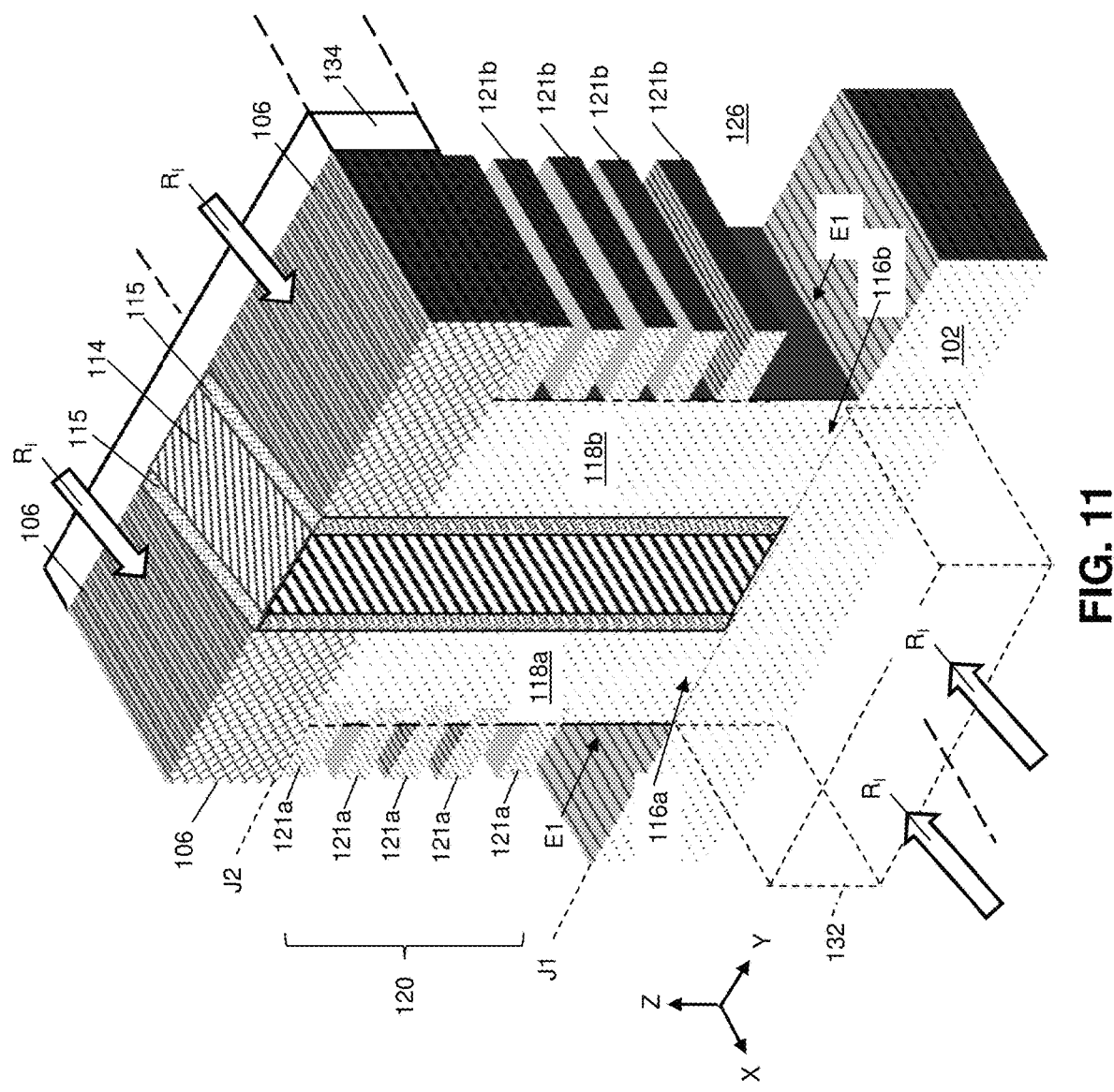
FIG. 11 shows a perspective view of an optical antenna with a silicon waveguide and nitride waveguide according to embodiments of the disclosure.

FIG. 11 depicts a perspective view of optical antenna(e) 116a, 116b, in which multiple input waveguides provide optical signals to be reflected by reflective material 114 and/or transmitted through protrusions 121a, 121b of diffraction gratings 120. For example, portions of semiconductor layer 102 may include an input waveguide 132 (shown with dashed lines) that is capable of transmitting optical signals into optical antenna(e) 116a, 116b, e.g., along the direction of the X-axis. Nitride cap 106 may include, or otherwise may be coupled to, a nitride waveguide 134. Nitride waveguide 134 may be positioned above optical antenna(e) 116a, 116b and portions of dielectric layer 126, and may be horizontally coupled to nitride cap 106 and/or otherwise coupled to an upper portion of optical antenna(e) 116. Each waveguide 132, 134 may transmit signals into optical antenna(e) 116a, 116b, where they may be reflected to other structures/devices using reflective material 114 and/or otherwise transmitted via protrusion(s) 121a, 121b.

Waveguide(s) 132, 134 may be formed as any suitable optical element or structure that is configured to transmit and/or receive optical signals. In a non-limiting example, waveguide(s) 132, 134 may include a core layer (not shown) formed from crystalline silicon, silicon nitride, and/or or other similar materials. Waveguide 132 in particular may include a silicon, silica, or silica doped material. In still further examples, waveguide(s) 132, 134 may include multicore fibers for optical coupling to optical antenna(e) 116a, 116b, gain media, other waveguides, and/or other components. In other non-limiting examples (not shown) waveguide(s) 132, 134 may also include a cladding layer and/or insulating jacket surrounding its core layer. In other non-limiting examples, waveguide(s) 132, 134 may be formed as and/or may be coupled to one or more fluoride fibers, chalcogenide fibers, and/or plastic fibers. However embodied, waveguide(s) 132, 134 may extend transversely from optical antenna(e) 116a, 116b along the X-axis or any other predetermined direction.

Figure 12:
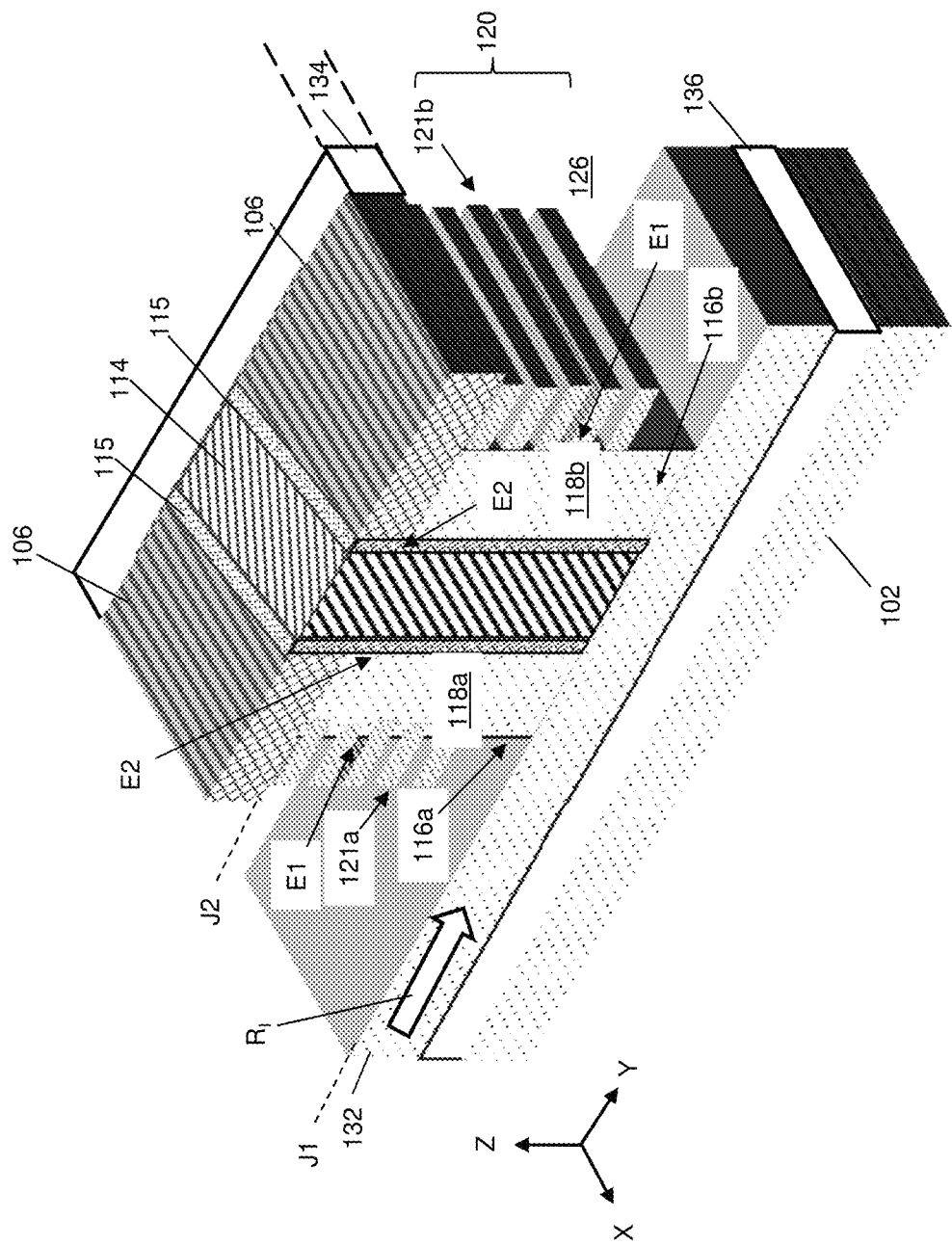
FIG. 12 shows a perspective view of an optical antenna with a laterally oriented silicon waveguide according to embodiments of the disclosure.
Figure 13:
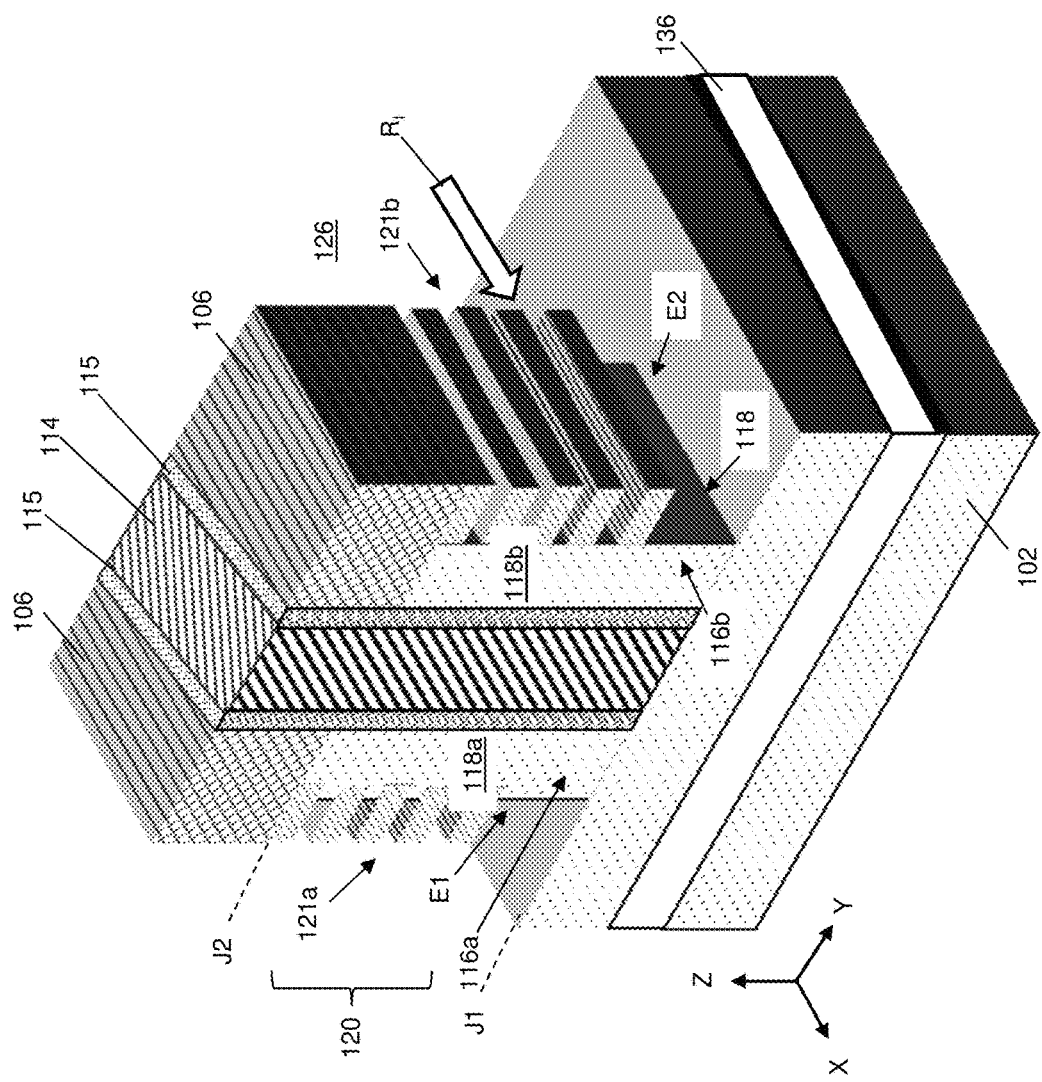
FIG. 13 shows an annotated perspective view of an optical antenna with a silicon waveguide in a further configuration according to embodiments of the disclosure.

FIGS. 12 and 13 depict further implementations of optical antenna(e) 116a, 116b, in which input waveguide 132 has a variety of directional orientations relative to optical antenna(e) 116a, 116b. In the example of FIG. 12, input waveguide 132 may have the same horizontal orientation (e.g., the Y-axis direction) as the width of semiconductor waveguide 118 between protrusions 121a, 121b. In the example of FIG. 13, input waveguide 132 may extend horizontally perpendicularly (e.g., in the X-axis direction) relative to the width of semiconductor waveguide 118 between reflective material 114 and protrusions 121a, 121b. In such implementations, input signals $R_c$ may travel horizontally through input waveguide 132 before entering optical antenna(e) 116a, 116b through semiconductor waveguide 118. In cases where nitride cap 106 includes, or is coupled to, nitride waveguide 134 (FIGS. 11, 12), nitride waveguide 134 similarly may have a variety of directional orientations in the X-Y plane. Furthermore, input waveguide 132 may extend horizontally beyond optical antenna(e) 116a, 116b, thus allowing optical coupling from input waveguide 132 to multiple optical antenna(e) 116a, 116b, as discussed elsewhere herein.

In the example configurations of FIGS. 12 and 13, semiconductor layer 102 may be structurally distinct from, and located beneath, input waveguide 132. In this case, input waveguide 132 may be formed within, and/or may include a portion of, a layered semiconductor-insulator-semiconductor substrate in place of a bulk semiconductor substrate. Input waveguide 132 thus may be a semiconductor-on-insulator (SOI) layer on a buried insulator layer 136. Buried insulator layer 136, in turn may be on semiconductor layer 102. Buried insulator layer 136 may include any currently-known or later developed substance for providing electrical insulation, and as examples may include: silicon nitride ($Si_3N_4$), silicon oxide ($SiO_2$), fluorinated $SiO_2$ (FSG), hydrogenated silicon oxycarbide (SiCOH), porous SiCOH, boro-phospho-silicate glass (BPSG), silsesquioxanes, carbon (C) doped oxides (i.e., organosilicates) that include atoms of silicon (Si), carbon (C), oxygen (O), and/or hydrogen (H), thermosetting polyarylene ethers, a spin-on silicon-carbon containing polymer material, near frictionless carbon (NFC), or layers thereof. In some cases, dielectric layer 126 and buried insulator layer 136 may have the same composition or similar compositions.

Embodiments of the disclosure provide several technical and commercial advantages, examples of which are discussed herein. Embodiments of optical antennae 116, when integrated into a PIC structure, provide optical coupling with greater effectiveness as a result of reflective material(s) 114 integrated therein. Reflective material(s) 114 may reflect light to further expand the vertical field of view from optical antenna(e) 116. The expanded field of view may be particularly suitable for photonic phased arrays, LiDAR applications, and/or other types of PICs. By forming reflective material(s) 114 in targeted positions adjacent semiconductor waveguide(s) 118 in embodiments of the disclosure, optical antenna(e) 116a, 116b may be fabricated to suit a variety of applications. Angles $\theta_1$, $\theta_2$, for example, can be individually adjusted by changing the horizontal separation distance from reflective material(s) 114, their angle relative to semiconductor layer(s) 102 and/or other materials thereunder, etc., during manufacture. Such adjustments, additionally, may affect the coupling efficiency through diffraction gratings 120 as noted herein. These and other properties of optical antenna(e) 116a, 116b can enable vertical coupling of various waveguide(s) (e.g., input waveguide 132 (FIGS. 11-13) and/or nitride waveguide 134 (FIG. 11)), while allowing for integration into standard silicon photonics processing.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate+/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An optical antenna for a photonic integrated circuit (PIC), the optical antenna comprising:
    a vertically oriented semiconductor waveguide with a first end opposite a second end, the first end on a semiconductor layer, and the vertically oriented semiconductor waveguide including a first sidewall and a second sidewall opposite the first sidewall;
    a reflective material along the second sidewall of the vertically oriented semiconductor waveguide;
    a first plurality of grating protrusions extending from the first sidewall of the vertically oriented semiconductor waveguide; and
    a nitride material on the second end of the vertically oriented semiconductor waveguide.

2. The optical antenna of claim 1, wherein a portion of the reflective material is adjacent the nitride material.

3. The optical antenna of claim 1, wherein the nitride material has a first portion on the second end of the vertically oriented semiconductor waveguide and a second portion on the reflective material.

4. The optical antenna of claim 1, wherein the reflective material includes one of a metal and a metal oxide.

5. The optical antenna of claim 1, further comprising a liner between the reflective material and the second sidewall of the vertically oriented semiconductor waveguide.

6. The optical antenna of claim 1, wherein the reflective material includes a material having a refractive index of at least approximately 1.50.

7. The optical antenna of claim 1, wherein the vertically oriented semiconductor waveguide includes a first plurality of semiconductor layers interdigitated with a second plurality of semiconductor layers having a different composition from the first stack of semiconductor layers.

8. The optical antenna of claim 7, wherein the first plurality of grating protrusions extends exclusively from one of the first plurality of semiconductor layers and the second plurality of semiconductor layers.

9. An optical antenna for a photonic integrated circuit (PIC), the optical antenna comprising:
    a first vertically oriented semiconductor waveguide with a first end on a semiconductor layer, the first vertically oriented semiconductor waveguide including a first sidewall and a second sidewall opposite the first sidewall;
    a reflective material along the second sidewall of the first vertically oriented semiconductor waveguide; and
    a first plurality of grating protrusions extending from the first sidewall of the first vertically oriented semiconductor waveguide;
    a dielectric layer horizontally adjacent the first vertically oriented semiconductor waveguide, wherein portions of the dielectric layer interdigitate with the first plurality of grating protrusions; and
    a nitride layer having a first portion on a second end of the first vertically oriented semiconductor waveguide.

10. The optical antenna of claim 9, wherein a portion of the reflective material is adjacent the nitride layer.

11. The optical antenna of claim 9, further comprising a liner on the reflective material, and the second sidewall of the first vertically oriented semiconductor waveguide.

12. The optical antenna of claim 9, wherein the nitride layer includes a second portion on the dielectric layer.

13. The optical antenna of claim 9, further comprising:
    a second vertically oriented semiconductor waveguide with a first end on the semiconductor layer, the second vertically oriented semiconductor waveguide including a first sidewall along the reflective material and a second sidewall opposite the first sidewall; and
    a second plurality of grating protrusions extending from the second sidewall of the second vertically oriented semiconductor waveguide, wherein a first horizontal distance between the reflective material and the first plurality of grating protrusions is different from a second horizontal distance between the reflective material and the second plurality of grating protrusions, such that the first plurality of grating protrusions has a different grating coupling efficiency from the second plurality of grating protrusions.

14. The optical antenna of claim 9, further comprising:
    a second vertically oriented semiconductor waveguide with a first end on the semiconductor layer, the second vertically oriented semiconductor waveguide including a first sidewall along the reflective material and a second sidewall opposite the first sidewall; and
    a second plurality of grating protrusions extending from the second sidewall of the second vertically oriented semiconductor waveguide, wherein the reflective material extends non-perpendicularly from an upper surface of the semiconductor layer, such that the first plurality of grating protrusions has a different grating coupling efficiency from the second plurality of grating protrusions.

15. A method of forming an optical antenna, the method comprising:
    forming a vertically oriented semiconductor waveguide over a semiconductor layer, the vertically oriented semiconductor waveguide including a first sidewall and a second sidewall opposite the first sidewall;
    forming a reflective material along the second sidewall of the vertically oriented semiconductor waveguide; and
    forming a first plurality of grating protrusions extending from the first sidewall of the vertically oriented semiconductor waveguide.

16. The method of claim 15, further comprising forming a nitride layer over the vertically oriented semiconductor waveguide, and adjacent a portion of the reflective material.

17. The method of claim 15, wherein forming the reflective material along the second sidewall of the vertically oriented semiconductor waveguide includes defining a horizontal distance between the reflective material and the first plurality of grating protrusions, the horizontal distance controlling a grating coupling efficiency of the first plurality of grating protrusions.

18. The method of claim 15, wherein forming the vertically oriented semiconductor waveguide includes forming a first plurality of semiconductor layers interdigitated with a second plurality of semiconductor layers having a different composition from the first stack of semiconductor layers.

19. The method of claim 15, wherein the reflective material includes one of a metal and a metal oxide.

20. The method of claim 15, further comprising forming a liner between the reflective material and the second sidewall of the vertically oriented semiconductor waveguide.

* * * * *